Oct. 7, 1969     W. O. McKENZIE JONES     3,470,601
METHOD FOR SETTING TOOLS

Filed Oct. 31, 1966                      2 Sheets-Sheet 1

Inventor
William Owen McKenzie Jones

Oct. 7, 1969   W. O. McKENZIE JONES   3,470,601
METHOD FOR SETTING TOOLS

Filed Oct. 31, 1966   2 Sheets-Sheet 2

Inventor
William Owen McKenzie Jones

United States Patent Office 3,470,601
Patented Oct. 7, 1969

3,470,601
METHOD FOR SETTING TOOLS
William Owen McKenzie Jones, Tudor Cottage, 12 Malvern Road, Maidenhead, Berkshire, England
Filed Oct. 31, 1966, Ser. No. 590,927
Claims priority, application Great Britain, Oct. 29, 1965, 45,958/65
Int. Cl. B23q 3/00, 17/00
U.S. Cl. 29—404                                  2 Claims

ABSTRACT OF THE DISCLOSURE

A method for pre-setting a machine tool in a jig having a table rotatable on a horizontal axis a known distance above a horizontal reference surface, with an axial holder block mounted thereon. The block has perpendicular adjustment to the axis, has a stop surface normal to the adjustment, and includes a face at a known distance from a vertical plane defined by feet at the jig back. Pre-setting is by coordinate measurements from the reference surface to, respectively, the perpendicular adjustment, the stop surface by 90° table rotation, and the face by placement of the jig on its back feet. The known distances, being related to one or more machine tool mounting members, allow three-dimensional pre-setting therefor.

---

This invention relates to jigs for pre-setting tools, or tools in tool holders for subsequent connection to machine tools.

My British Patent No. 921,602, date of application and filing complete specification Apr. 7, 1959, No. 11,685/59, describes systems of mounting tools and/or tool holders on machine tools with tools in a pre-set position to avoid setting up on the machine tools.

The pre-setting or adjustment of a tool, or of a tool in its holder, for subsequent connection to a machine tool is performed in accordance with the invention at a place apart from the machine tool on a jig having a mounting and location means simulating those on the machine tool on which the tool is to be used. This is made possible by measuring the distance between reference surfaces on a tool mounting on the machine tool and the centre line of the work piece holder and a plane along the centre line, measuring the distance between corresponding reference surfaces on the tool mounting means on the jig and reference planes or surfaces on the jig, securing the tool or tool holder to the mounting means on the jig, and setting up the cutting edge of the tool in a tool holder or in the body of the tool at a predetermined distance from the reference surfaces on the mounting by measuring from the reference planes of the jig.

When a tool which has been pre-set in this manner is subsequently mounted on the machine tool it will be set accurately for a machining operation without further adjustment.

The jig preferably comprises a rotatable table having means for locking it at one or more angular positions and means for attaching a tool or tool holder to the table in a known position relative to a reference plane so that the position of the tool relative to the reference plane can be pre-set. This enables the tool or the tool in the tool holder to be set in two planes by pre-setting the tool or tool in the tool holder at a predetermined distance from one reference plane and then rotating the table on the jig through 90° and setting the tool in the second plane at a predetermined distance from the same reference plane.

The means for holding the tool or tool holder in a predetermined position on the table should locate the tool or tool holder both vertically and horizontally as well as angularly and a suitable mounting comprises a dovetail arrangement.

Figure 1:
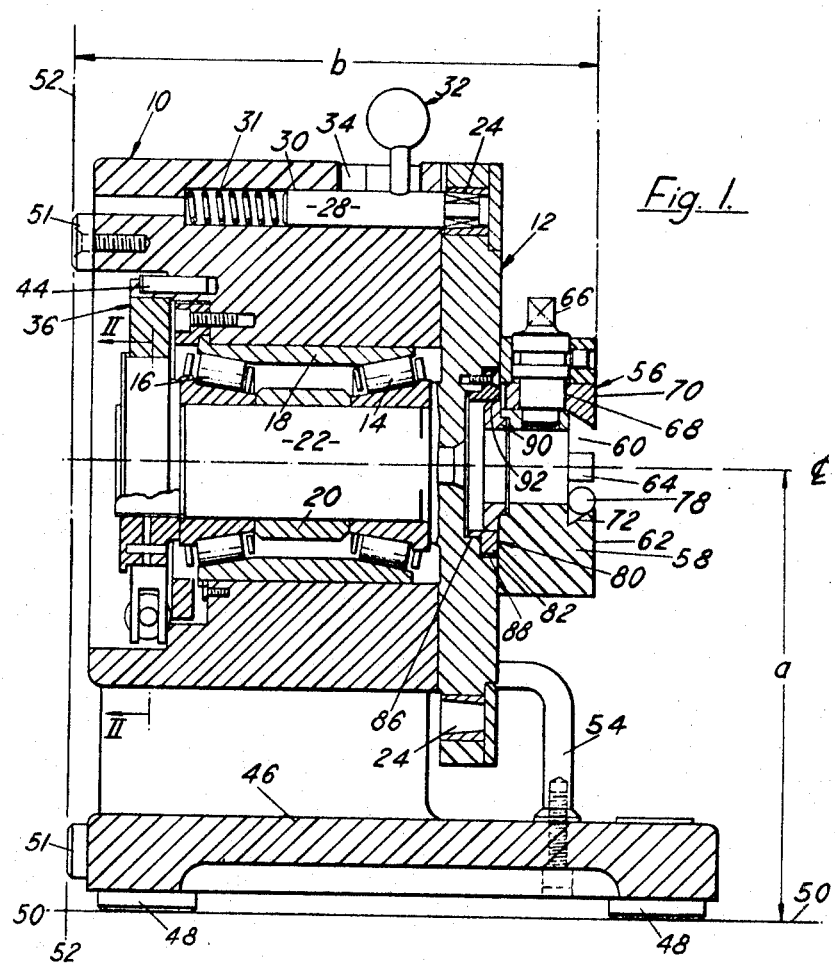
Figure 2:
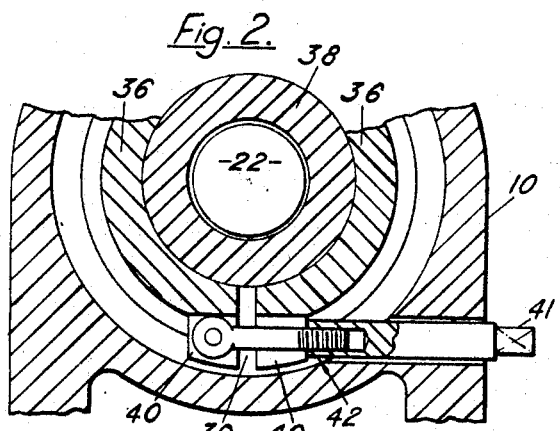
Figure 3:
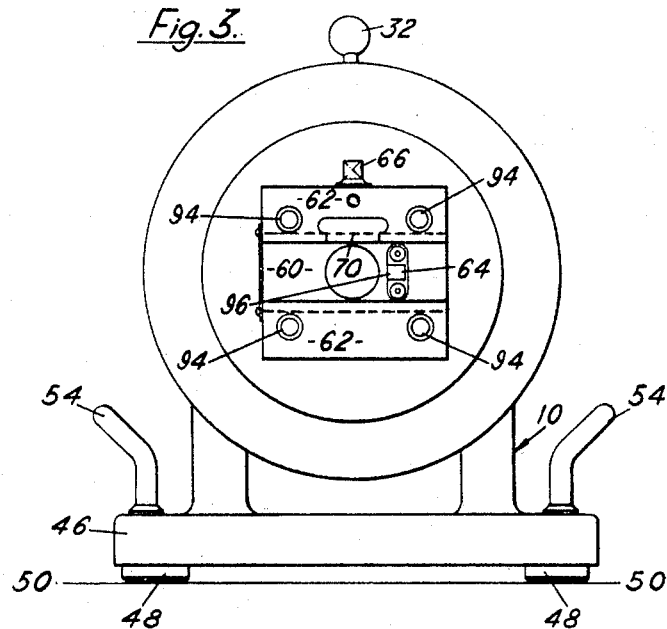
Figure 4:
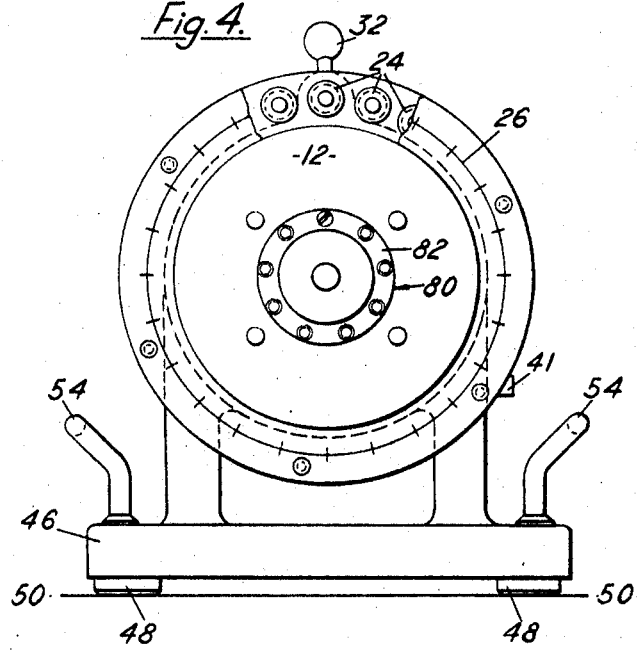

An embodiment of a jig in accordance with the invention will now be described by way of example with reference to the accompanying drawings in which:

FIGURE 1 is a sectional side elevation of the jig;
FIGURE 2 is a section through FIGURE 1 along the line II—II;
FIGURE 3 is a front elevation of the jig with a mounting member; and
FIGURE 4 is a front elevation of the jig with the mounting member removed.

The jig comprises a cast steel body member 10 in which a table 12 is supported by two roller bearings 14, 16 which are mounted in a cartridge of which an outer sleeve 18 is held in the body member 10 and an inner sleeve 20 engages a shaft 22 projecting inwardly from the table 12. The play in the bearing is eliminated by arranging the two sets of rollers 14, 16, which are tapered, to act against each other.

The roller bearings 14, 16 enable the table 12 to be rotated relative to the body member 10. The table is locked in a number of positions corresponding to the positions of tapered holes 24 which are machined in the back of the table 12 so that it can be locked in the vertical position or at 10° intervals from the vertical. A scale 26 (FIGURE 4) is marked on the face of the table to indicate the angular relationship of each hole 24 to the vertical. The means for locking the table 12 in any one of the positions comprises a bolt 28 which fits closely in a slot 30 and is urged by a spring 31 to engage in one of the holes 24. When it is desired to release the table 12 the bolt 28 is withdrawn from the hole 24 by means of an arm 32 which engages in an L-shaped guide 34. When the table 12 is in the released position the bolt 28 can be held in the retracted position by engaging it in the arm of the L-shaped slot 34, to prevent damage to the end of the bolt 28 during rotation of the table 12.

If it is desired to lock the table 12 at an angle intermediate the holes 24 the bolt 28 is left retracted and the table 12 rotated to the desired angle which is indicated by a pointer covering the scale 26 and clamped by means of a metal shoe 36 which surrounds a drum 38 at the end of the shaft 22 remote from the table 12. The shoe 36 has a slot 39 at either side of which two radial projections 40 are formed and arranged so that the two projections can be drawn together by rotating a lug 41 which turns a screw device 42 to tighten the shoe 36 around the drum 38 in the desired position. The shoe 36 itself is prevented from rotating by a pin 44 (FIGURE 1) which fits snugly in a recess at the uppermost part of the shoe 36.

In normal operation when the table 12 is locked in a desired angular positon of the bolt 28 engaging in one of the holes 24 the shoe 36 is loose to allow the table 12 to be rotated freely.

The body member 10 has a base 46 which is provided with feet 48 which are accurately machined so that when the jig is stood on a flat surface 50 the centre line ₵ of the shaft 22 is within 0.001" (0.025 mm.) of a standard measurement (dimension $a$) say 6 inches (15 cm.).

Similar feet 51 are provided at the back of the body member 10 and these are machined so that the tolerance in the standard measurement between the face of the table and the plane 52 defined by the surface of the feet 51 is within ±0.003" (0.008 mm.).

Lifting handles 54 are attached to the base 46 to a lifting jig and turning it from the upright position to that in which it rests on the feet 51 on its back.

The front of the table 12 is fitted with a female dovetail member 56 comprising a block 58 having a female dovetail 60 accurately machined in its face 62 which is also machined to a very close dimensional tolerance. When a tool (not shown) having a male dovetail portion is to be fitted, the male dovetail portion is engaged in the female member 56 and slid along the dovetail 60 until an adjustable stop on the male portion strikes a stop 64 on the female portion. The two portions are then locked together by turning a lug 66 projecting upwardly from the block 58. This action turns a spindle having a cam surface 68 formed on it which acts to move a part 70 of the upper edge of the dovetail sideways thus urging the lower edge of the male dovetail firmly against the solid edge 72 of the female member 56 as well as causing a reference base on the male portion to abut the bottom surface of the female dovetail 60.

In order to be able to pre-set tools or tool holders or the like in the jig the female dovetail member 56 on the jig corresponds to a similar dovetail member which provides a tool mounting on the machine tool. The distance between the reference surfaces on the mounting (namely the face 62 of the dovetail member, its lower solid edge 72 and the stop 64) and the centre line of a work piece holder and a plane along the centre line are known so that if the distances from the corresponding surfaces on the dovetail member on the jig to the planes 50 and 52 are accurately measured, then a tool or tool holder secured to the dovetail can be set up by taking calculated measurements from the reference planes. The tool will then be correctly positioned relative to the work piece when it is subsequently mounted on the mounting or the machine tool.

The female dovetail member 56 must therefore be correctly mounted having its lower, solid edge 72 at a standard distance from the surface 50 on which the jig is standing. The distance is measured when the table is located in the vertical position by placing a ⅜″ (or 1 cm.) diameter gauge bar 78 in the V formed by the lower edge 72 of the dovetail, and then measuring the distance of the uppermost part of the bar 78 from the surface 50 along its entire length by means of a clock gauge.

The distance of the bar 78 from the surface 50 is varied by altering the angular position of an adjustment bush 80 which is mounted on table 12.

The bush 80 comprises a short cylinder having a flange 82. The outer surface of the cylindrical portion engages in a bore 86 in the centre of a table 12, and the flange fits into the enlarged outer end 88 of the bore so that it is flush with the face of the table 12.

The inner bore of the bush 80 is 0.002″ (0.05 mm.) eccentric with the outer surface so that as the bush 80 is rotated relative to the table 12 the centre line of the bore is moved up and down relative to the surface 50. In order to hold the bush 80 at the desired angular position a sholulder formed between the bore 86 and its enlarged outer end 88 is drilled and tapped with an even number of holes, say 4, one of which is aligned with one of 9 holes (i.e. an uneven number) on the flange 82 of the bush 80. This gives 36 positions in which the bush 80 can be held relative to the table; in other words, the variation in the height of the centre line of the inner bore of the bush 80 for each position is something less than 0.0001″ (0.0025 mm.).

The female dovetail member 56 is located on the table 12 by a location bush 90 which may either be machined integrally with the block 58 so that its centre line is co-axial with that of the dovetail member 56 and at a specific distance from the solid edge 72 or alternatively the bush 90 may be made separately and adapted to engage in a bore in the block 58 very accurately.

The outer surface 92 of the bush 90 is engaged with the inner bore of the adjustment bush 80 to locate the dovetail member 56. Having established the correct height of the bar 78 above the surface 50, the block 58 is rotated until the bar 78 is parallel with the surface 50. The block 58 is then locked permanently in position by tightening clamping bolts 94 (FIGURE 3).

As both the distance between the plane 52 and the face of the table 12, and the width of the block 58 are held to close tolerances the dimension $b$ is standard. Any further necessary adjustment may be made by machining the feet 51 or the face 62 appropriately.

Location of a tool or a tool holder in the dovetail 60 along the length of the dovetail 60 is effected by abutment of an adjustable stop on the tool or tool holder against the fixed stop 64 on the female dovetail member 56.

In order to adjust the position of the stop surface 96 on the stop 64, the table 12 is rotated through 90° from the position shown at FIGS. 1 and 3 so that the distance between the surface 50 and the stop surface 96 can be measured and machined so that its distance from the surface 50, and therefore from the centre line ₵, is a specific preselected distance. The dimensions $a$, $b$ and the distance between the surface 50 and the stop surface 96 are chosen so that they are related to similar distances on each female dovetail mounting member on one or more machine tools. This enables the tool or tool holder to be mounted on the jig in a known position relative to the centre line ₵ and the face 62, or in other words to the plane 52 and the surface 50.

The tool or the tool in the tool holder can be adjusted in the three planes by measuring the distances of the cutting edge(s) from the surface 50 and setting the cutting edge(s) at a predetermined distance. The table 12 is rotated through 90° and locked in the new position and the cutting edge(s) of the tool is set relative to the surface 96. The cutting edge(s) of the tool are set in the third plane by tipping the whole jig over so that its rests on the feet 51 on its back. The cutting edge(s) is then set in the third plane. All the measurements are checked before the tool or tool holder is removed from the jig. The tool or tool holder is then ready for attachment to its mounting member on the machine tool, and will assume a pre-set position to a very high degree of accuracy. In addition to setting a tool at an exact position relative to the said reference surfaces or planes, the rake of the tool in the tool holder can be set accurately by rotating the table 12 to the desired angle and locking it so that a clock or dial gauge can be used to determine parallelism between the tool and the surface 50 at the desired angle to the axis of the dovetail.

Although the jig has been described having a dovetail mounting member attached to the table 12 for locating a tool or a tool holder, other arrangements may be used; for example a mounting arrangement such as the one described in my co-pending British application No. 45,125/65 is suitable.

I claim:

1. A method of pre-setting a tool or a tool in a tool holder or carrier for subsequent connection to a machine tool for a machining operation comprising measuring the distance between reference surfaces on a tool mounting on the machine tool and the centre line of a work piece holder and a plane along the centre line, measuring the distance between corresponding reference surfaces on the tool mounting means of a jig simulating a machine tool and reference planes or surfaces on the jig, securing the tool or tool holder to the mounting means on the jig, and setting up the cutting edge of the tool in a holder or in the body of the tool and at a predetermined distance from the reference surfaces of the mounting by measuring from the reference surfaces of the jig.

2. A method as claimed in claim 1 in which the tool or the tool in the tool holder is set in two planes by pre-setting the tool or the tool in the tool holder at a predetermined distance from one reference plane and then rotating the mounting on the jig through 90° and setting the tool in the second plane at a predetermined distance from the same reference plane.

References Cited

UNITED STATES PATENTS

| | | | |
|---|---|---|---|
| 1,463,269 | 7/1923 | Johnson | 29—464 |
| 2,324,476 | 7/1943 | Becker | 29—406 X |
| 2,359,425 | 2/1945 | Becker. | |
| 2,406,043 | 8/1946 | Sorensen. | |
| 2,506,082 | 2/1950 | Hartman | 29—404 X |
| 3,200,506 | 8/1965 | Jeanneret | 33—185 |
| 3,271,848 | 9/1966 | Montandon | 29—407 |
| 3,377,685 | 4/1968 | Carlstedt. | |

THOMAS H. EAGER, Primary Examiner

U.S. Cl. X.R.

29—407, 464; 33—174

UNITED STATES PATENT OFFICE
CERTIFICATE OF CORRECTION

Patent No. 3,470,601                                           October 7, 1969

William Owen McKenzie Jones

It is certified that error appears in the above identified patent and that said Letters Patent are hereby corrected as shown below:

Column 3, line 56, "sholulder" should read -- shoulder --. Column 4, line 35, "its" should read -- it --. Column 5, line 8 "2,359,425" should read -- 2,369,425 --.

Signed and sealed this 27th day of October 1970.

(SEAL)
Attest:

Edward M. Fletcher, Jr.                                   WILLIAM E. SCHUYLER, JR
Attesting Officer                                                  Commissioner of Patents